INVENTORS
R.M. CARLSON
L.P. JASORKA
J.F. MULCONREY
G.A. TRIMBLE

ATTORNEY

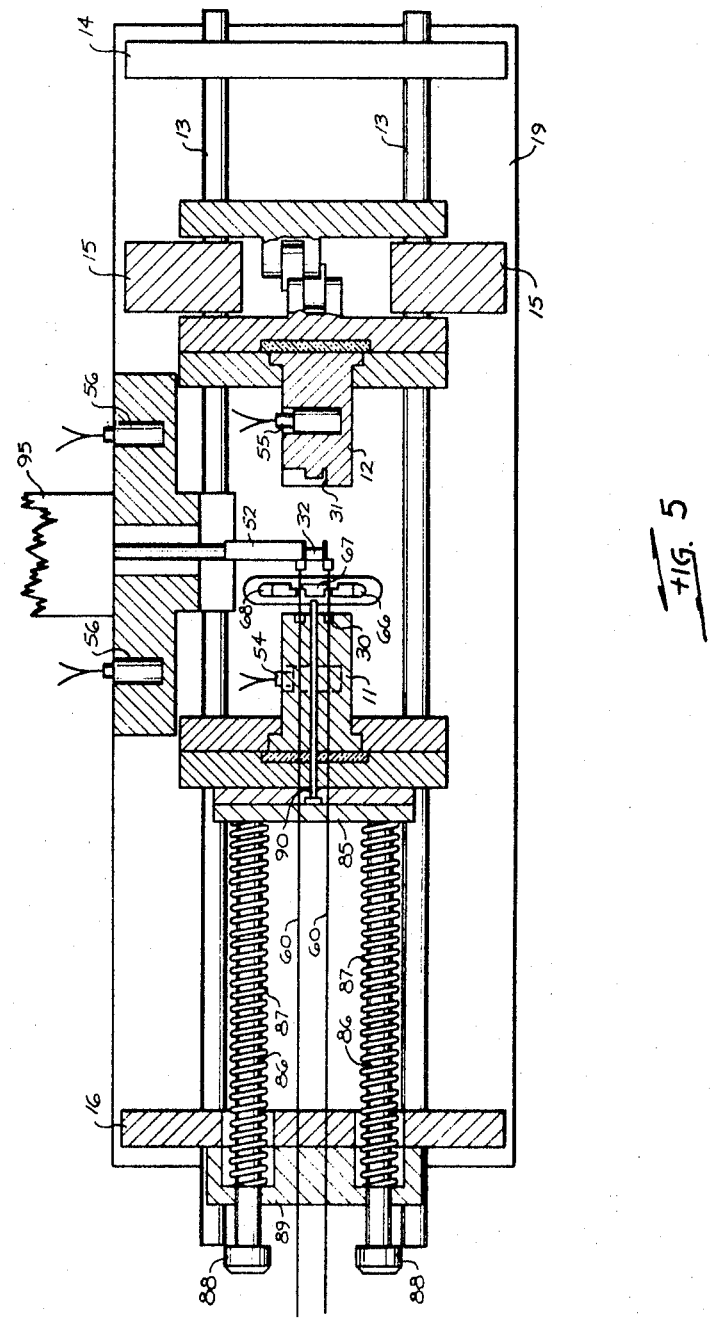

United States Patent Office 3,458,931
Patented Aug. 5, 1969

3,458,931
METHOD FOR MOLDING TERMINALS IN WORKPIECES
Robert M. Carlson, Gahanna, Larry P. Jasorka, Columbus, and John F. Mulconrey and Glenn A. Trimble, Gahanna, Ohio, assignors to Western Electric Company, Incorporated, New York, N.Y., a corporation of New York
Original application Sept. 16, 1963, Ser. No. 309,125, now Patent No. 3,330,019, dated July 11, 1967. Divided and this application June 9, 1967, Ser. No. 652,646
Int. Cl. H01r *9/00;* B23p *17/00*
U.S. Cl. 29—630
4 Claims

ABSTRACT OF THE DISCLOSURE

Methods of molding terminals in bobbins including the steps of threading a plurality of wires through openings formed in a first die block so that the ends of the wires extend from a portion of the die block which forms a mold cavity when joined with a second die block. The ends of the wires are enlarged slightly by coining and the first die block is moved toward the second die block thereby pulling the enlarged, coined ends of the wires therewith into the mold cavity formed by the joined first and second die blocks. A plastic material is deposited into the mold cavity and is cured therein to form the bobbin having the coined ends of the wires embedded therein. Thereafter, the first and second die blocks are moved apart and intermediate portions of the wires are cut to provide the terminals extending from the bobbin. Additionally, the ends of the wires are coined in preparation for the molding of a subsequent bobbin.

---

This is a division of application Ser. No. 309,125, filed Sept. 16, 1963, now Patent No. 3,330,019.

This invention relates to methods of molding workpieces and particularly to methods of molding terminals in a workpiece simultaneously with the molding of the workpiece.

In the manufacture of small coil forms of miniature electrical components for electronic switching systems, difficulty is encountered in providing the small coil forms with terminals. In some instances the surface into which the terminals are to be placed are only one-sixteenth of an inch wide and the terminals are manufactured from 22-gauge wire. Further, as the terminals must be accurately positioned in the coil form so as to mate with component units when assembled, it is extremely difficult and tedious to properly position the terminals in the coil form.

Applicant discovered that by molding terminal wire stock into the coil form simultaneously with the molding of the coil form, the difficulties inherent in inserting terminals into completed coil forms were avoided. Difficulty was encountered, however, in cutting the terminal wire stock so as to properly form the terminals in the coil form and to coin cut ends of the wire stock for subsequent molding operations.

Therefore, an object of the present invention is to provide a new and improved method of providing workpieces with terminals.

A further object of the present invention is to provide a new and improved method of molding terminals in workpieces.

It is a further object of the invention to provide a new and improved method of molding strands of terminal wire stock in a workpiece simultaneously with the molding of the workpiece.

It is an additional object of the invention to provide a new and improved method of molding strands of terminal wire stock in a workpiece simultaneously with the molding of the workpiece and for coining the terminal wire stock for subsequent molding operations while simultaneously cutting the terminal wire stock to form terminals in the workpiece.

With these and other objects in view, the present invention contemplates a method of molding terminals in a workpiece simultaneously with the molding of the workpiece, wherein: at least one strand of terminal wire stock is advanced with a die block as the die block is displaced to form a molding cavity with a second die block, plastic material is supplied to the molding cavity, and heat is applied to the molding cavity to mold the workpiece about the strands of terminal wire stock. Subsequently, the die blocks are displaced apart to release the workpiece and the terminal wire stock is cut and coined to form terminals in the workpieces and to flatten the terminal wire stock for subsequent molding operations.

Other objects and advantages of the present invention will be apparent from the following detailed description when considered in conjunction with the accompanying drawings, wherein:

FIG. 5 is a sectional view of FIG. 2 taken along lines 5—5;

Figure 1:
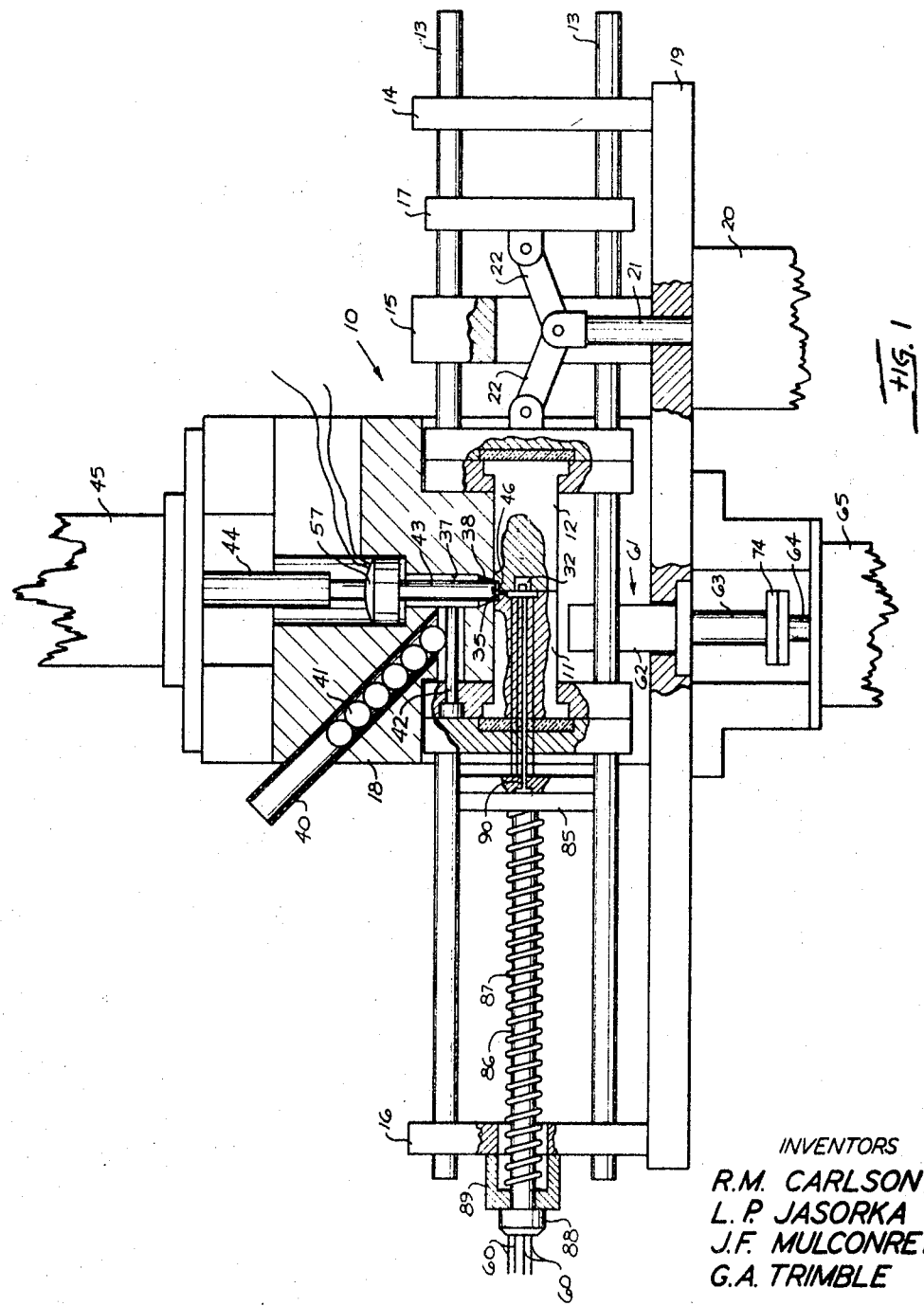
FIG. 1 is a partially cutaway side view of an apparatus embodying the principle features of the instant invention.

As seen in FIG. 1, an apparatus for molding workpieces and for simultaneously molding terminals therein is generally indicated by the numeral 10. A pair of die blocks 11 and 12 are mounted on a plurality of spaced, parallel guides 13 so as to oppose each other. The die block 11 is fixedly mounted on the guides 13, and the die block 12 is slidably mounted on the guides 13. The guides 13 are slidably mounted in a plurality of spaced blocks 14, 15 and 16 and are fixedly mounted in a block 17. A material feeding housing 18 is provided with bushings (not shown) to permit the guides 13 to move freely through the housing. The blocks 14, 15 and 16 support the guides 13 on a frame 19 of the molding apparatus 10 in a substantially parallel relationship.

A plunger actuator 20 is mounted on the frame 19 so as to act in a direction substantially perpendicular to the longitudinal axis of the guides 13. A plunger 21 of the actuator 20 is connected to the block 17 and the die block 12 by linkages 22.

As the actuator 20 is actuated to move the plunger 21 downwardly, the block 17 and the die block 12 are displaced toward each other. As the block 17 is fixedly mounted on the guides 13, displacement of the block 17 to the left (FIGS. 1 and 2) also displaces the guides 13 and the die block 11 to the left. Thus, the die blocks 11 and 12 are displaced away from each other when the actuator 20 displaces the plunger 21 downwardly. Upon the actuator 20 displacing the plunger 21 upwardly, the die blocks 11 and 12 will be displaced toward each other in the same manner.

Figure 2:
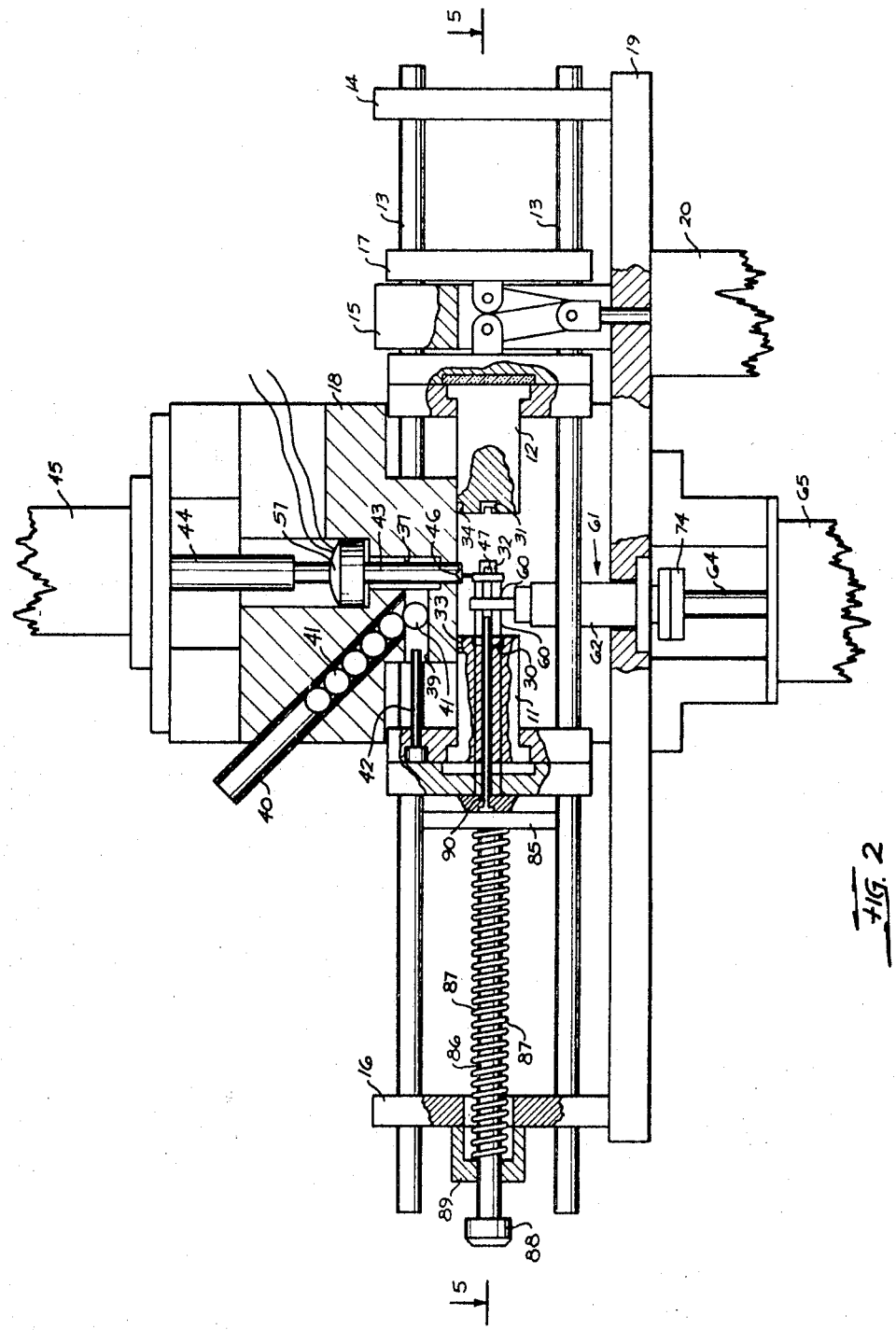
FIG. 2 is the same view as FIG. 1 showing an operational sequence of the apparatus.

As is more clearly seen in FIG. 2, the die blocks 11 and 12 have formed therein mating cavities 30 and 31, respectively. These cavities 30 and 31 form a molding cavity when the die blocks 11 and 12 are closed (FIGS. 1 and 3) wherein a workpiece 32 is molded. The die blocks 11 and 12 are also provided with slots 33 and 34 which form an aperture 35 (FIGS. 1 and 3) when the die blocks are closed.

The material feeding housing 18 is provided with a generally cylindrical bore 37 which communicates with the aperture 35 when the die blocks 11 and 12 are closed. A lower end 38 of the bore 37 is tapered to mate with the aperture 35. A passageway 39 communicates with the bore 37 and is generally perpendicular to the bore 37. A feeding tube 40 intercepts the passageway 39 at an angle. A plurality of pellets 41 of thermosetting material are fed successively through the feeding tube 40 and, therefore, into the passageway 39.

As seen in FIG. 1, when the die blocks 11 and 12 are closed, a push rod 42, carried by the die block 11, is extended into the passageway 39 so as to prohibit the pellets 41 from dropping into the passageway 39. When the die blocks 11 and 12 are open (FIG. 2), the push rod 42 is retracted so as to permit the leading pellet 41 to fall into the passageway 39. This leading pellet 41 then prohibits further pellets from falling into the passageway 39.

A ram 43 is reciprocally mounted in the bore 37. A plunger 44 of an actuator 45, when actuated, extends or retracts the ram 43 in the bore 37.

Figure 3:
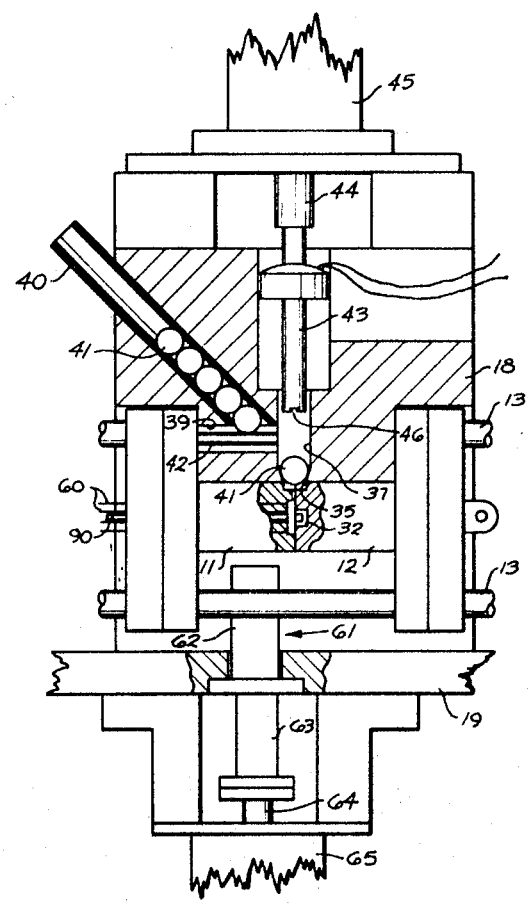
FIG. 3 is a partial view of FIGS. 1 and 2 showing a further operational sequence of the apparatus.

As seen in FIG. 3, with the die blocks 11 and 12 closed and one of the pellets 41 in the bore 37, the actuator 45 extends the ram 43 to advance the pellet 41 into the molding cavity formed by the cavities 30 and 31 of the die blocks 11 and 12.

Figure 4:
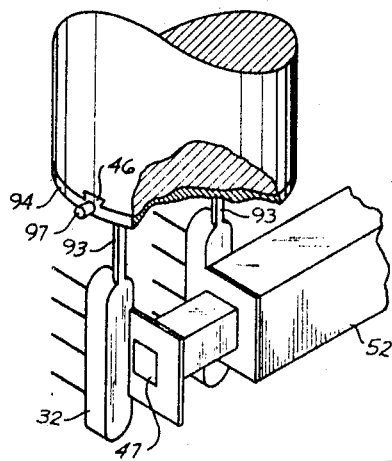
FIG. 4 is an enlarged view of a molded workpiece.

As is best seen in FIGS. 4 and 5, the ram 43 is provided with a dovetail slot 46, and a core rod 47 is extended into the molding cavity. When heat is applied to the thermosetting material of the pellet 41, the workpiece 32 is molded into the dovetail slot 46 and about the core rod 47. Thus, the ram 43 and the core rod 47 support the workpiece 32 for subsequent operations when the die blocks 11 and 12 are opened.

As will be more readily seen in FIG. 5, the die block 12 is provided with a slot 50. The slot 50 forms an aperture when the die blocks 11 and 12 are closed which aperture permits a core housing 52 and the core rod 47 to extend into the molding cavity. The core rod 47 forms an aperture in the workpiece 32 for the subsequent insertion of a coil core when the workpiece is utilized as a coil form. The core rod housing 52 also forms a portion of the molding cavity.

Figure 6:
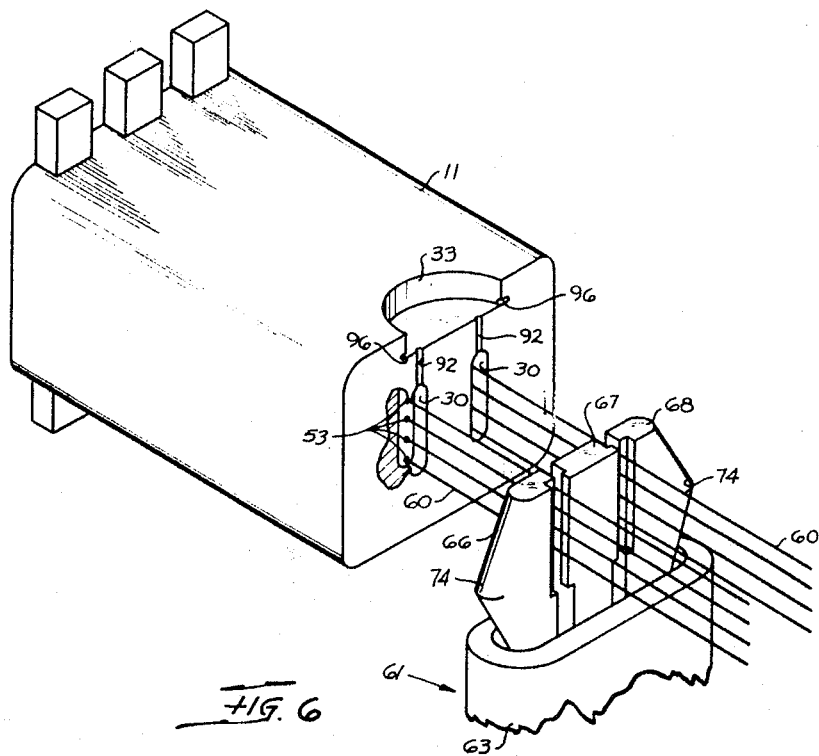
FIG. 6 is an enlarged view of a portion of a molding cavity and a wire coining and cutting tool.

As best seen in FIGS. 2 and 6, a plurality of strands 60 of terminal wire stock extends through the die block 11. Thus, upon the workpiece 32 being molded in the cavity formed by the die blocks 11 and 12, the ends of the strands 60 of the terminal wire stock are also molded into the workpiece 32. As seen in FIG. 6, by properly positioning a plurality of apertures 53 formed in the die block 11, the strands 60 of the terminal wire stock are properly positioned in the molding cavity; and the strands of terminal wire stock are, thus, molded in the workpiece 32 in their predetermined terminal positions.

The die blocks 11 and 12 are provided with heating elements 54 and 55, respectively, and the core rod housing 52 is provided with heating elements 56. The ram 43 is also heated by a heating element 57. Thus, by supplying current to the heating elements 54, 55, 56 and 57 in any conventional manner, the thermosetting material is molded into the workpiece 32 in the molding cavity.

Rs shown in FIG. 1, a cutting and coining tool is generally indicated by the numeral 61. A sleeve 62 of the tool 61 is fixedly mounted to the frame 19 of the molding apparatus 10.

Figure 7:
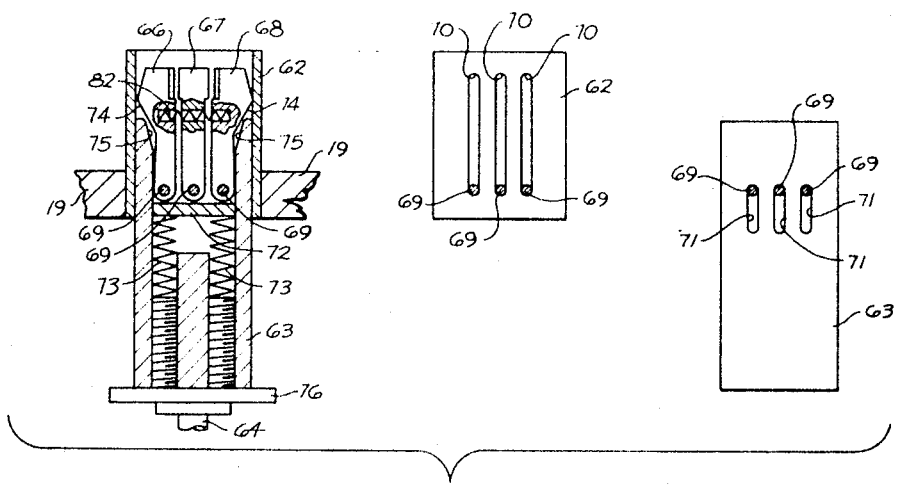
FIG. 7 is an enlarged sectional view of the terminal wire coining and cutting tool taken from FIG. 1 and showing the cutaway portions of the tool.

Referring to FIG. 7, a second sleeve 63 is carried by a plunger 64 of a hydraulic cylinder actuator 65 (FIG. 1) so as to be axially displaceable within the sleeve 62. Fingers or wire-forming elements 66, 67 and 68 are retained in the sleeves 62 and 63 by a plurality of pins 69. The pins 69 extend into a corresponding plurality of slots 70 of the sleeve 62 and a corresponding plurality of slots 71 of the sleeve 63.

A disc 72 is spring biased by a plurality of springs 73 away from the plunger 64 so as to constantly maintain tension on the fingers 66, 67 and 68 to urge the pins 69 against the top of the slots 71 in the sleeve 63. When the plunger 64 is retracted, as seen in FIGS. 1 and 3, the tool 61 is positioned as shown in FIG. 7. In this position the pins 69 are near the bottom of the slots 70 of the sleeve 62 and at the top of the slots 71 of the sleeve 63.

Figure 8:
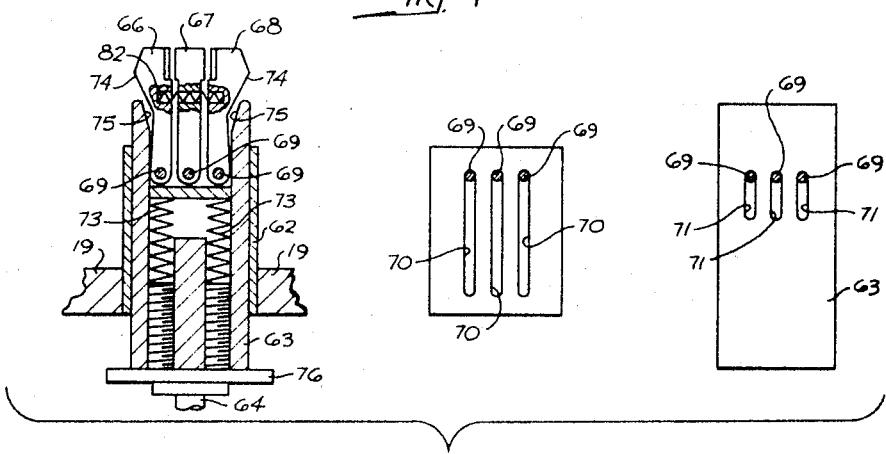
FIG. 8 is the same view as FIG. 7 showing an operational sequence of the tool.

As the actuator 65 is actuated to extend the plunger 64, the sleeve 63 is displaced upwardly with the plunger 64. The fingers 66, 67 and 68 in response to the urgings of the springs 73 are also displaced upwardly with the sleeve 63 until the pins 69 reach the top of the slots 70 in the sleeve 62. FIGS. 6 and 8 show the tool 61 in this position.

Figure 9:
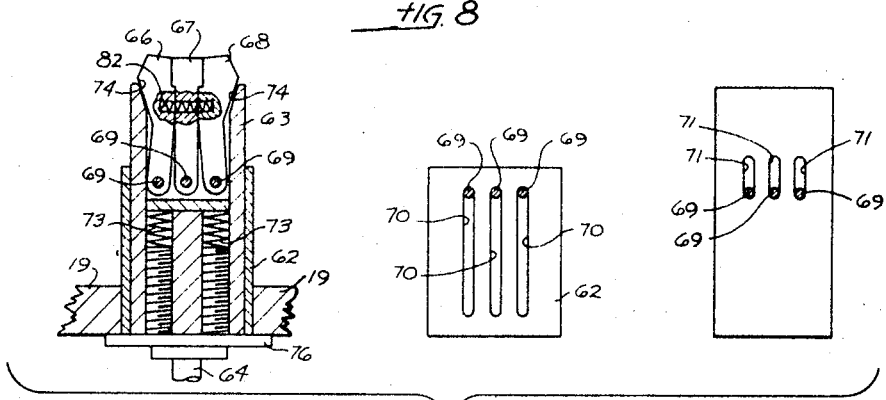
FIG. 9 is the same view as FIGS. 7 and 8 showing an additional operational sequence of the tool.

Further displacement of the plunger 64 displaces the sleeve 63 relative to the sleeve 62 and the fingers 66, 67 and 68, as seen in FIG. 9. As the pins 69 are at the top of the slots 70, further displacement of the plunger 64 does not continue to displace the fingers 66, 67 and 68 but compresses the springs 73. The fingers 66 and 68 are provided with camming surfaces 74. The sleeve 63 has a tapered portion 75 which cooperates with the camming surfaces 74 of the fingers 66 and 68. Thus, upon further displacement of the sleeve 63, as shown in FIG. 9, the fingers 66, 67 and 68 will be forced together. The travel of the sleeve 63 is limited by a stop 76 on the plunger 64 striking the frame 19.

Figure 10:
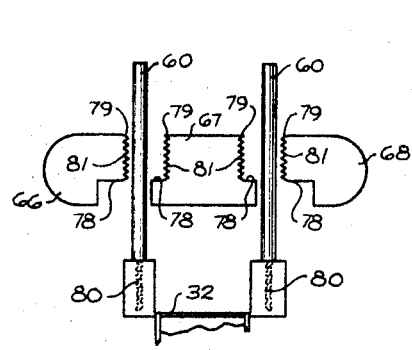
FIG. 10 is a partial view of FIG. 8 looking down on the tool and showing the position of strands of terminal wire stock and of a workpiece in the tool.

As the tool 61 is extended to the position shown in FIG. 8, the fingers 66, 67 and 68 are advanced to position the strands 60 of terminal wire stock between the fingers (FIGS. 6 and 10). Upon further displacement of the plunger 64 to the position shown in FIG. 9, the fingers 66, 67 and 68 are closed, as shown in FIG. 11, to cut the ends of the strands 60 of terminal wire stock molded into the workpiece 32 from the terminal wire stock thereby forming a plurality of terminals 77 in the molded workpiece 32.

Figure 11:
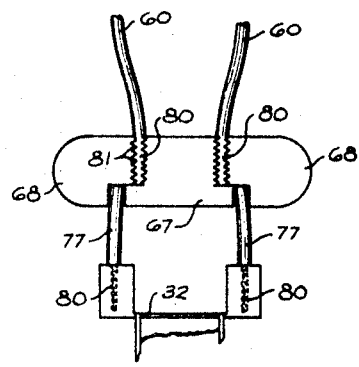
FIG. 11 is a partial view of FIG. 9 looking down on the tool and showing the position of strands of terminal wire stock and of a workpiece in the tool.

In the position shown in FIGS. 9 and 11, the ends of the strands 60 are coined or flattened between the fingers 66, 67 and 68. Shearing surfaces 78 of the fingers 66, 67 and 68 cut or shear the terminals 77 from the terminal wire stock strands 60, and coining surfaces 79 of the fingers flatten ends 80 of the terminal wire stock strands 60. The coining surfaces 79 are also provided with serrations 81 which burr the flattened ends 80 for better retention in the subsequently molded workpiece 32.

As seen in FIGS. 7, 8 and 9, the spring 82 urges the fingers 66, 67 and 68 away from one another when the plunger 64 and the sleeve 63 are retracted by the hydraulic cylinder actuator 65. The sleeve 63 is fixedly mounted on the plunger 64 so as to be directly responsive to displacement of the plunger 64.

A block 85 is fixedly mounted on the end of a pair of spaced shafts 86 (FIGS. 1, 2 and 5) and is spring biased by compression springs 87 toward the die block 11. The shafts 86 are provided with stops 88 which upon striking butt plates 89 of the block 16 restrict further displacement of the block 85 toward the die block 11.

An ejector rod 90 is carried by the block 85 and extends into a passageway 91 of the die block 11. As the die blocks 11 and 12 are opened, i.e., displaced away from each other, the ejector rod 90 is extended into the cavity 30 of the die block 11 so as to eject the workpiece 32 from the die block.

Referring to FIGS. 4 and 6, the die block 11 is provided with slots 92 through which the thermosetting material flows into the molding cavity from the aperture 35. The die block 12 is provided with similar slots which mate with the slots 92. Cull portions 93 of the workpiece 32 are molded in the slots 92. A coin-like cull portion 94 is molded in the aperture 35 below the ram 43. The cull portions 93 and 94 facilitate subsequent handling of the workpieces 32. On the finished workpiece 32 the cull portions 93 and 94 are broken away from the workpiece.

As seen in FIGS. 4 and 5, the core rod 45 and the ram 43 support the molded workpiece 32 after the workpiece is ejected from the die blocks 11 and 12. After the coining and shearing operation, an actuator 95 withdraws the core rod 47 from the workpiece 32 and the actuator 45 retracts the ram 43 to permit the workpiece 32 to drop from the molding apparatus 10. The core rod housing 52 strips the workpiece 32 from the core rod 47 as the core rod is retracted by the actuator 95. The slot 33 is provided with recessed portions 96 which mate with similar recessed portions in the slot 34 and wherein projecting pin-like portions 97 of the coin-like cull portion 94 are molded. Upon the ram 43 being retracted, the pin-like portions 97 strike the material feeding housing 18 and strip the workpiece 32 from the ram 43.

As the die blocks 11 and 12 are closed, i.e., are displaced towards each other until they meet, the die block 11 advances relative to the strands 60 of the terminal wire stock until the apertures 53 of the die block 11 meet the coined or flattened portion 80 of the strands 60. Further movement of the die block 11 towards the die block 12 advances the strands 60 with the die block 11 so as to position the strands 60 in the cavity 30 in the proper terminal positions for subsequent molding of another workpiece 32 in the die.

In operation

Starting the sequence with FIG. 1, wherein a workpiece 32 has been molded in the die, the first step is to actuate the actuator 20 to displace the plunger 21 downwardly to open the die blocks 11 and 12. In this position the leading pellet 41 in the feeding tube 40 will drop into the passageway 39 as the push rod 42 is withdrawn from the passageway 39 by the displacement of the die block 11. The ejector rod 90 is also advanced into the cavity 30 of the die block 11 to eject the workpiece 32.

The actuator 65 is then actuated to extend the tool 61. The molding apparatus 10 will at this point assume the position shown in FIG. 2. Upon the plunger 64 being displaced to the end of its travel by the actuator 65, the tool 61 will cut and coin the strands 60 of the terminal wire stock, as shown in FIGS. 9 and 11.

At this point, the actuator 65 is actuated to retract the tool 61, the actuator 45 is actuator 45 is actuated to retracted the core rod 47 and the actuator 20 is actuated to retract the ram 43 thereby ejecting the workpiece 32 from the molding apparatus 10.

The actuator 20 is then actuated to extend the plunger 21 so as to close the die blocks 11 and 12 and advance the pellet 41 in the passageway 39 into the bore 37, and the core rod 47 is extended into the die by actuator 95. The molding apparatus 10 thus assumes the position shown in FIG. 3.

The actuator 65 is actuated at this point to advance the ram 43 in the bore 37 so as to advance the pellet 41 into the molding cavity. Heat is applied to the thermosetting material by heating elements 54, 55, 56 and 57 so as to mold a workpiece 32 in the molding cavity.

The molding apparatus 10 thus has assumed the position set forth in FIG. 1, and the sequence of operation is repeated to eject the formed workpiece 32 and to form a subsequent workpiece. In setting up the molding apparatus 10 for operation, it is necessary, as will be obvious to one skilled in the art, to first coin the ends of the strands 60 of the terminal wire stock after the strands are inserted through the die block 11.

Any conventional source of power and switching arrangement may be utilized to supply current to the heating elements 54, 55, 56 and 57 for heating the thermosetting material. Further, any conventional facility may be utilized for displacing the plungers 21, 44 and 64 and for displacing the core rod 47. For example, solenoids, air cylinders or hydraulic cylinders could be used advantageously. As will be obvious to anyone skilled in the art, any conventional means can be employed to actuate the actuators 20, 45, 65 and 95 depending upon which particular type of actuator is used.

It is also contemplated that an air blast can be used to blow the workpiece 32 from the molding apparatus 10 into a chute (not shown) as the workpiece is released from the ram 43 to exhaust the workpiece from the molding apparatus. Passage of the workpiece 32 through the chute can be sensed and utilized to start a new sequence of operation, thereby making the apparatus automatic.

Futher, it would be within the scope of the invention to direct terminal wire stock into the molding cavities through both of the die blocks 11 and 12 where it is desirable to mold a workpiece having terminals on two sides.

It will be understood that the above-described arrangement is merely illustrative of the principles of the invention and many other modifications of the invention may be made without departing from the spirit and scope thereof.

What is claimed is:

1. A method of molding strands of terminal wire stock in a workpiece, comprising the steps of:
   placing the strands of the terminal wire stock through apertures of a first die block so that ends of the strands extend from a molding-cavity side of the die block,
   coining the ends of the strands of the terminal wire stock extending from the apertures in the first die block to a size larger than the diameter of the apertures,
   displacing said first die block relative to a second die block to bring the die blocks together to form a molding cavity, the first die block engaging the coined ends of the strands of the terminal wire stock and advancing the strands into the molding cavity as the die blocks are closed,
   feeding a predetermined amount of thermosetting material into the molding cavity, and
   applying heat to the molding cavity to mold the thermosetting material about the strands of the terminal wire stock.

2. A method of molding terminals in a workpiece, comprising the steps of:
   placing strands of terminal wire stock through apertures of a first die block so that ends of the strands extend from a molding-cavity side of the die block,
   coining the ends of the strands of the terminal wire stock extending from the apertures in the first die block to a size larger than the diameter of the apertures,
   displacing the first die block relative to a second die block to bring the die blocks together to form a molding cavity, the first die block engaging the coined ends of the strands of the terminal wire stock and advancing the strands into the molding cavity as the die blocks are closed,
   feeding a predetermined amount of thermosetting material into the molding cavity, applying heat to the molding cavity to mold the thermosetting material into a workpiece about the strands of the terminal wire stock, and cutting the ends of the strands of the terminal wire stock which are molded in the molded workpiece to form terminals therein.

3. A method of successively forming terminals containing workpieces wherein a plurality of strands of terminal wire stock extends through apertures in and from a molding-cavity side of a first die block and are molded in the successively formed workpieces, comprising in seriatim the steps of:

cutting portions of the strands of the terminal wire stock between the molding-cavity side of the first die block and a molded workpiece to form the workpiece having terminals molded therein and extending therefrom, the remaining end portions of the strands of the terminal wire stock extending from the molding-cavity side of the first die block, coining the cut remaining ends of the strands of the terminal wire stock extending from the first die block to a size larger than the apertures in the first die block, displacing the first die block relative to a second die block to bring the die blocks together to form a molding cavity, the first die block engaging the coined ends of the strands of the terminal wire stock and advancing the strands into the molding cavity, feeding a predetermined amount of hardenable resinous material into the molding cavity, and hardening said resinous material about the coined ends of the strands of the terminal wire stock to mold a workpiece.

4. A method of forming a molded plastic piece part having at least one elongated member of dissimilar material extending therefrom, comprising the steps of:

placing at least one elongated member of dissimilar material in a laterally enclosed passage of a segment of a mold, deforming a portion of the elongated member extending through the laterally enclosed passage in the segment of the mold, causing relative movement between the segment of the mold through which the elongated member extends and at least one other segment of the mold to form a mold cavity and to contemporaneously move the deformed portion of the elongated member into the mold cavity, feeding a plastic material into the molding cavity to form a molded plastic piece part having the deformed portion of the elongated member molded therein, and removing the molded piece part with the elongated member extending therefrom from the mold cavity by causing relative movement of the segments of the mold longitudinally of the axis of the mold.

References Cited

UNITED STATES PATENTS

| | | | |
|---|---|---|---|
| 3,149,375 | 9/1964 | Gehl | 18—36 XR |
| 3,209,409 | 10/1965 | Grathwohl | 18—36 |
| 3,330,004 | 7/1967 | Cloyd et al. | 18—36 |
| 2,900,662 | 8/1959 | Scherry. | |
| 3,133,981 | 5/1964 | Seele | 264—261 |

JOHN F. CAMPBELL, Primary Examiner

ROBERT W. CHURCH, Assistant Examiner

U.S. Cl. X.R.

18—5, 36; 29—627, 527, 602, 620; 264—272